United States Patent
Sumi

(10) Patent No.: US 7,722,465 B2
(45) Date of Patent: May 25, 2010

(54) IMAGE GENERATION DEVICE, IMAGE DISPLAY METHOD AND PROGRAM PRODUCT

(75) Inventor: Masayuki Sumi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 597 days.

(21) Appl. No.: 11/092,608

(22) Filed: Mar. 30, 2005

(65) Prior Publication Data

US 2005/0272506 A1 Dec. 8, 2005

(30) Foreign Application Priority Data

Mar. 31, 2004 (JP) ............................. 2004-107621

(51) Int. Cl.
*A63F 13/00* (2006.01)

(52) U.S. Cl. .......................................... 463/31; 463/32

(58) Field of Classification Search .................... 463/32, 463/31, 1

See application file for complete search history.

(56) References Cited

U.S. PATENT DOCUMENTS

| 4,068,393 | A | 1/1978 | Tararine et al. |
| 6,352,479 | B1 * | 3/2002 | Sparks, II ..................... 463/42 |
| 6,379,249 | B1 * | 4/2002 | Satsukawa et al. ............ 463/31 |
| 6,582,299 | B1 * | 6/2003 | Matsuyama et al. ............ 463/2 |
| 6,672,962 | B1 * | 1/2004 | Ozaki et al. .................... 463/37 |
| 6,951,515 | B2 * | 10/2005 | Ohshima et al. .............. 463/31 |
| 6,972,734 | B1 * | 12/2005 | Ohshima et al. ................ 345/8 |
| 2002/0061131 | A1 * | 5/2002 | Sawhney et al. ............ 382/154 |
| 2003/0032478 | A1 * | 2/2003 | Takahama et al. ............. 463/30 |
| 2003/0096649 | A1 * | 5/2003 | Hamano et al. ............... 463/36 |

FOREIGN PATENT DOCUMENTS

| EP | 0 841 640 | 5/1998 |
| EP | 0 879 624 | 11/1998 |
| JP | 08-069274 | 3/1996 |
| JP | 2001-046743 | 2/2001 |
| JP | 2003-208263 | 7/2003 |

* cited by examiner

*Primary Examiner*—John M Hotaling
*Assistant Examiner*—Eric M Thomas
(74) *Attorney, Agent, or Firm*—Finnegan, Henderson, Farabow, Garrett & Dunner, L.L.P.

(57) ABSTRACT

Upon projecting the inside of a virtual space on a prescribed projection plane and generating a two-dimensional image, foremost, the relative position of the operational unit and the relative direction designated with such operational unit are acquired, and these are substituted with the position and direction in the virtual space. Next, the position of the operational unit in the virtual space is shifted a prescribed amount horizontally and/or vertically to set the starting point, and an ending point is set on a virtual line extending along the direction designated by the operational unit in the virtual space. Next, a virtual viewpoint which approximately matches the position and direction of the operational unit in the virtual space is set and subject to projective transformation, and a two-dimensional image containing the trajectory image corresponding to a part or the entirety of the zone connecting the starting point and ending point is generated thereby.

23 Claims, 8 Drawing Sheets

F I G. 5
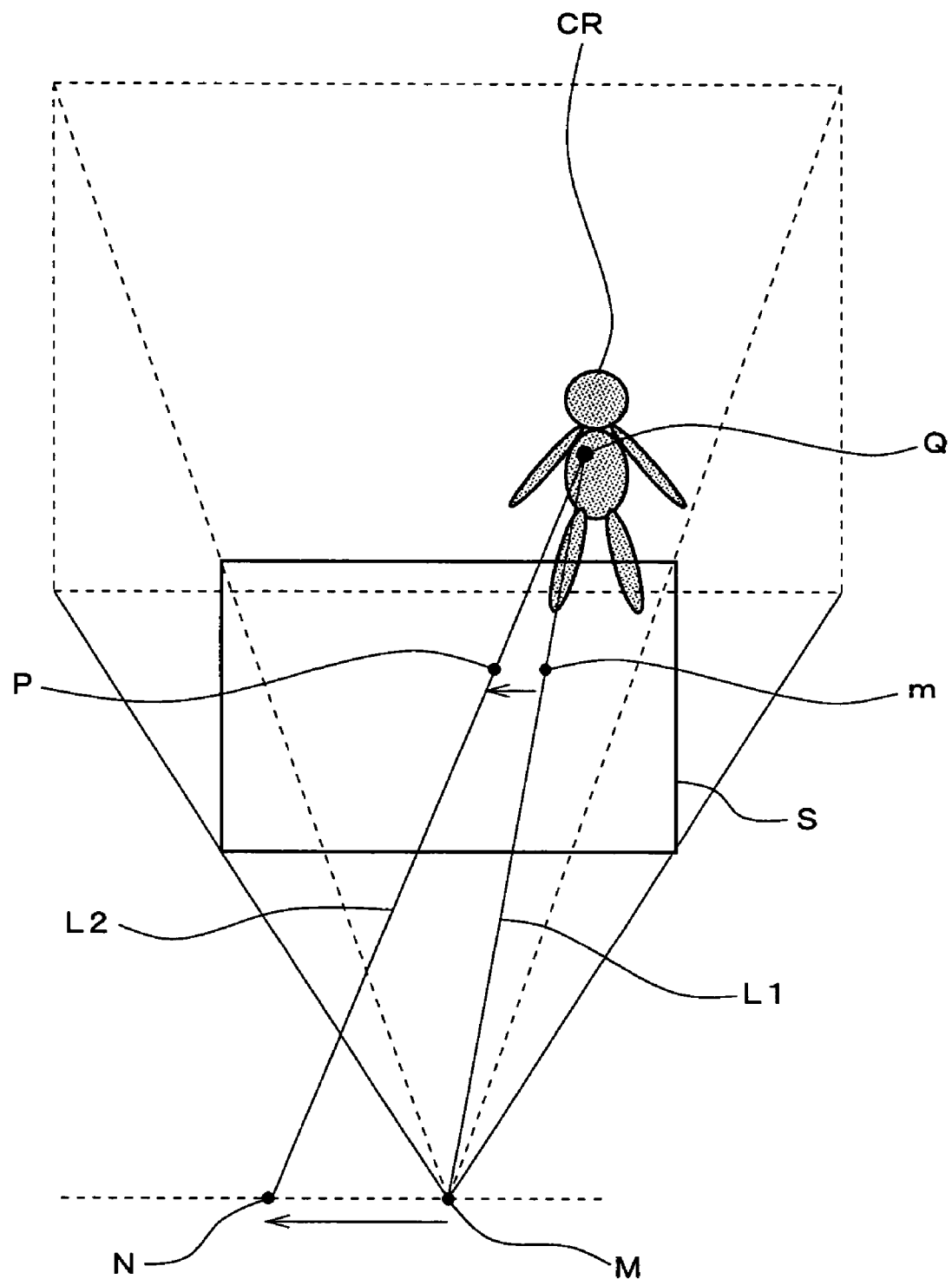

F I G. 7
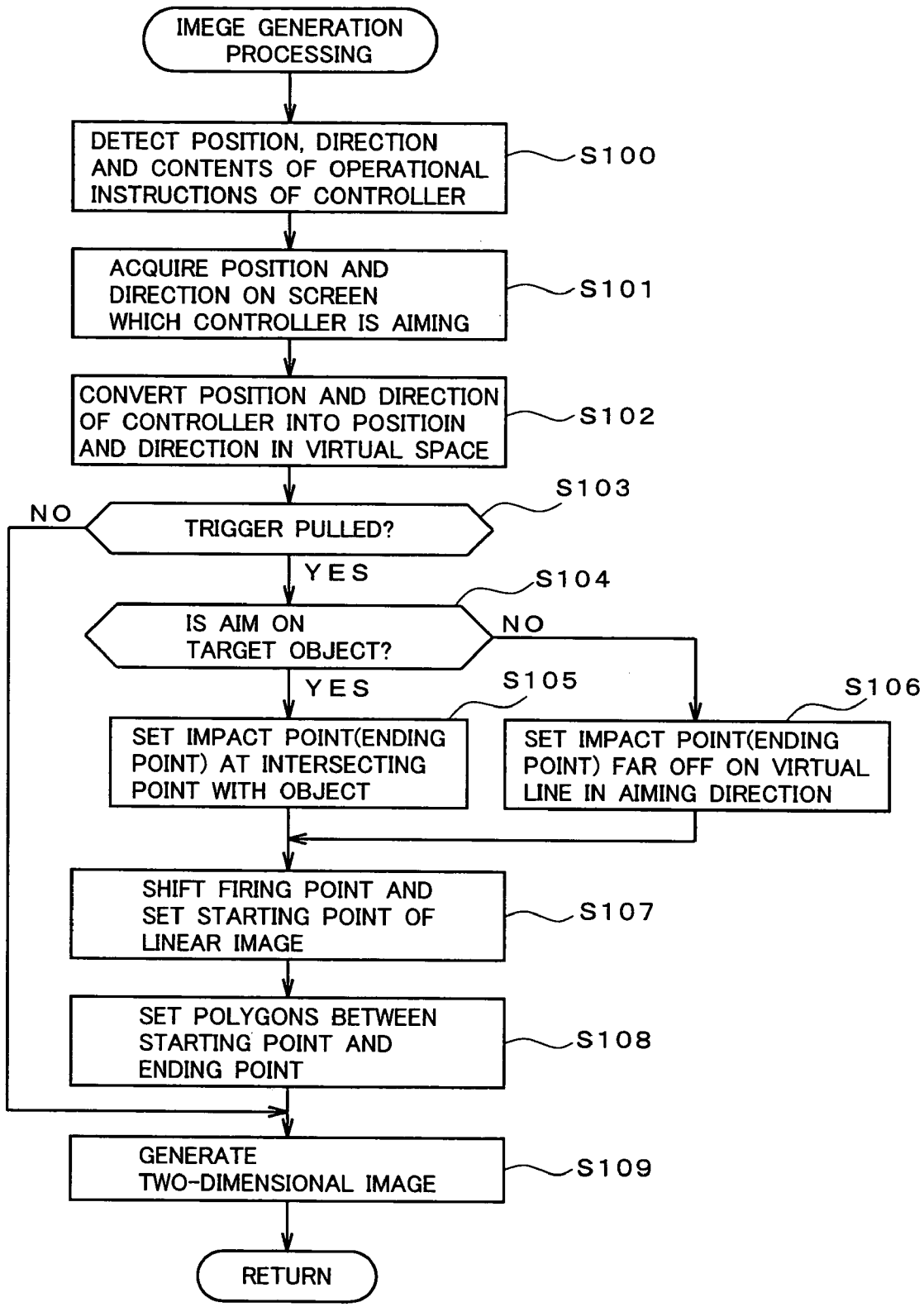

F I G. 8
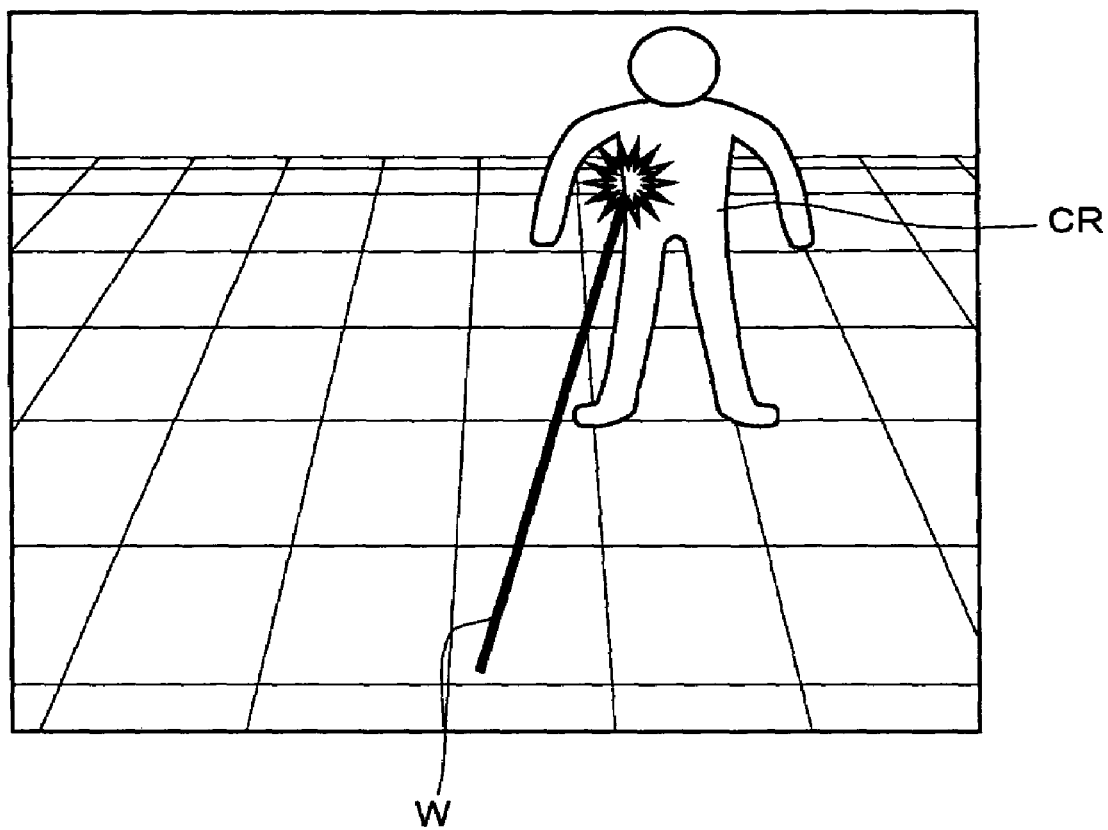

IMAGE GENERATION DEVICE, IMAGE DISPLAY METHOD AND PROGRAM PRODUCT

CROSS-REFERENCES

The entire disclosure of Japanese Patent Application No. 2004-107621 filed on Mar. 31, 2004 including specification, claims, drawings and summary are incorporated herein by reference in its entirety.

BACKGROUND

1. Field of the Invention

The present invention pertains to image processing technology suitable for game devices and various simulators (virtual reality devices) that conduct three-dimensional (3D) image display.

2. Description of the Related Art

A game device for shooting a target character (e.g., an enemy such as a person) appearing on the screen with a gun-shaped controller having a shape imitating a gun is conventionally known. With this kind of shooting game or the like, in addition to a game which is played by operating a player character displayed on the screen, there is a game which conducts a so-called first person point of view by displaying the status in the virtual space (game space) viewed from the operator's viewpoint on the screen. As a result of such first person point of view being displayed as an image, the operator will be able to enjoy a sensation of aiming at a target object (an enemy character, for example) in the virtual space from the muzzle of the gun-shaped controller operated by such operator in the real space. Image display technology of such first person point of view is described, for instance, in Japanese Patent Laid-Open Publication No. H8-69274.

In a shooting game, it is preferable to adopt the display method of displaying the trajectory of the bullet fired from the player character's gun since the expressiveness of the game image will be enhanced. Nevertheless, when adopting the image expression of the first person point of view described above, it was difficult to effectively express the trajectory of the bullet. Specifically, upon adopting the image expression of the first person point of view, generally speaking, a position roughly matching the operator's viewpoint or a position of the muzzle near such position is set as the virtual viewpoint, and a two-dimensional image (game image) is generated by performing projective transformation to the inside of the game image and projecting this on a prescribed projection plane in correspondence with this virtual viewpoint. Nevertheless, when the position of this virtual viewpoint is set to the operator's viewpoint or a position in the vicinity thereof, since the trajectory of the bullet will also head toward the aimed position from the virtual viewpoint or a position in the vicinity thereof, the trajectory in the two-dimensional image obtained pursuant to the projective transformation will be displayed in an approximate point-like pattern, and the trajectory of the bullet cannot be sufficiently expressed.

SUMMARY

Thus, an object of the present invention is to provide technology enabling the effective expression of the trajectory of a bullet or the like heading from the operator side toward the virtual space in an image display device of games and so on adopting the first person point of view.

In the first mode of the present invention, provided is an image generation device, comprising: an image processing means for disposing a target object and a viewpoint in a virtual space, and generating an image of the target object viewed from the viewpoint; a display unit for displaying the image generated with the image processing means; an operational means to be operated by a player for aiming at a target displayed on the display unit; a detection means for detecting at least either the spatial position or direction of the operational means in relation to the display unit; and a control means for executing a program product including processing for determining the collision of a discharge body fired from the firing position set in the virtual space and the target object according to the operation signal from the operational means; wherein the control means, upon receiving the operation signal from the operational means, determines the starting point position shifted from the firing position in the virtual space and an ending point position to which the discharge body fired from the firing position arrives based on the detection signal received from the detection means, makes the image processing means generate the trajectory image of the discharge body heading from the starting point position toward the ending point position, and displays the trajectory image on the display unit.

Here, the term "operational means" refers to a controller to be held or worn by the operator for inputting various operational instructions, and, although there is no limitation on the shape thereof, it is preferable that such controller is formed in a shape associated with the image generated with the image generation means. As this kind of operational means, for example, there is a gun-shaped controller having a shape imitating various types of guns (pistol, rifle, laser gun, etc.). Here, the term "object" refers to the various objects to be disposed in the virtually set space (virtual space), and, although there is no limitation on the content thereof, various items such as human or animal characters, objects such as obstacles or buildings, or elements constituting the background and so on may be employed. Further, a "target object" is an "object" described above that will become a target of action such as in a shooting game (e.g., an object to become the enemy character). Moreover, a "discharge body", for example, corresponds to a bullet or the like in a shooting game.

According to the foregoing constitution, since the trajectory image is displayed in a zone which begins from a position that is different than the firing position of the discharge body, the trajectory in the two-dimensional image after projective transformation will not be a point-like pattern upon expressing the trajectory of a bullet in a shooting game or otherwise expressing images similar thereto. Therefore, for instance, it will be possible to effectively express the trajectory of a bullet or the like heading from the player side toward the virtual space in an image display device of games and so on adopting the first person point of view. According to the present invention, in addition to the trajectory of a bullet, for example, effective expression of images is enabled in various cases such as when expressing an image of pointing at a desired position in the virtual space with a laser pointer as the operational means.

Preferably, the control means disposes a trajectory object in the virtual space covering a part or the entirety of a virtual line heading from the starting point position to the ending point position, makes the image processing means generate the trajectory image by projecting the trajectory object on the projection plane of a viewpoint coordinate system of the viewpoint, and displays the trajectory image on the display unit.

Thereby, a trajectory image can be easily generated.

Preferably, when the target object intersecting with the virtual line exists in the virtual space, the control means sets the ending point position at the intersecting point of the target object and the virtual line.

Thereby, a trajectory image will be displayed in the zone from a prescribed position on the front side (operator side) to the intersecting point with the target object. Therefore, this is preferable since the expression of the trajectory upon a bullet hitting the object such as an enemy character in a shooting game or the like, or the expression of indicating a prescribed position of an object with a laser pointer can be conducted accurately.

Preferably, when the target object intersecting with the virtual line does not exists in the virtual space, the control means sets an approximate infinite distance on the virtual line as the ending point position.

Thereby, this is preferable since the expression of the trajectory upon a bullet that did not hit the object such as an enemy character in a shooting game or the like flying to a distance can be conducted more accurately.

In the second mode of the present invention, provided is an image display method of an image generation device, comprising: an image processing means for disposing a target object and a viewpoint in a virtual space, and generating an image of the target object viewed from the viewpoint; a display unit for displaying the image generated with the image processing means; an operation-means to be operated by a player for aiming at a target displayed on the display unit; a detection means for detecting at least either the spatial position or direction of the operation means in relation to the display unit; and a control means for executing a game program product including processing for determining the collision of a discharge body fired from the firing position of the discharge body set in the virtual space and the target object in response to the operation signal from the operation means; wherein the control means performs: a step of determining, upon receiving the operation signal from the operation means, the starting point position shifted from the firing position in the virtual space and an ending point position to which the discharge body fired from the firing position arrives based on the detection signal received from the detection means; and a step of making the image processing means generate the trajectory image of the discharge body heading from the starting point position toward the ending point position, and displaying the trajectory image on the display unit. In other words, the foregoing invention is an adaptation of the first mode as a method invention.

Thereby, the effective expression of the trajectory of a bullet or the like heading from the player side toward the virtual space is enabled in an image display device of games and so on adopting the first person point of view.

Preferably, the control means performs: a step of disposing a trajectory object in the virtual space covering a part or the entirety of a virtual line heading from the starting point position to the ending point position; and a step of making the image processing means generate the trajectory image by projecting the trajectory object on the projection plane of a viewpoint coordinate system of the viewpoint, and displaying the trajectory image on the display unit.

Preferably, the control means performs: a step of determining whether the target object intersecting with the virtual line exists in the virtual space; and a step of setting the ending point position at the intersecting point of the target object and the virtual line when the target object exists.

Preferably, the control means performs: a step of determining whether the target object intersecting with the virtual line exists in the virtual space; and a step of setting an approximate infinite distance on the virtual line as the ending point position when the target object does not exist.

In the third mode of the present invention, provided is a program product to be executed with an image processing system including: an image processing means for disposing a target object and a viewpoint in a virtual space, and generating an image of the target object viewed from the viewpoint; a display unit for displaying the image generated with the image processing means; an operation means to be operated by a player for aiming at a target displayed on the display unit; a detection means for detecting at least either the spatial position or direction of the operation means in relation to the display unit; and a control means for executing a program product including processing for determining the collision of a discharge body fired from the firing position of the discharge body set in the virtual space and the target object in response to the operation signal from the operation means; wherein the program product is constituted to be capable of making the control means perform: a step of determining, upon receiving the operation signal from the operation means, the starting point position shifted from the firing position in the virtual space and an ending point position to which the discharge body fired from the firing position arrives based on the detection signal received from the detection means; and a step of making the image processing means generate the trajectory image of the discharge body heading from the starting point position toward the ending point position, and displaying the trajectory image on the display unit. In other words, the foregoing invention relates to a program product for executing the method invention pertaining to the second mode described above.

Preferably, the program product is further constituted to be capable of making the control means perform: a step of disposing a trajectory object in the virtual space covering a part or the entirety of a virtual line heading from the starting point position to the ending point position; and a step of making the image processing means generate the trajectory image by projecting the trajectory object on the projection plane of a viewpoint coordinate system of the viewpoint, and displaying the trajectory image on the display unit.

Preferably, the program product is further constituted to be capable of making the control means perform: a step of determining whether the target object intersecting with the virtual line exists in the virtual space; and a step of setting the ending point position at the intersecting point of the target object and the virtual line when the target object exists.

Preferably, the program product is further constituted to be capable of making the control means perform: a step of determining whether the target object intersecting with the virtual line exists in the virtual space; and a step of setting an approximate infinite distance on the virtual line as the ending point position when the target object does not exist.

In the fourth mode of the present invention, provided is an image processing device, comprising: an image processing means for disposing a target object and a viewpoint in a virtual space, and generating an image of the target object viewed from the viewpoint; a display unit for displaying the image generated with the image processing means; an operation means to be operated by a player for designating a target to be displayed on the display unit, and inputting operations for firing the discharge body toward the target object in the virtual space; a detection means for detecting at least either the spatial position or direction of the operation means in relation to the display unit; and a control means for executing a program product for determining the ending point position in which the discharge body to be fired from the reference position set in the virtual space arrives at the target object, and judges the collision of the discharge body and the target object at the ending point position; wherein the control means, upon receiving the input operation signal for firing the discharge body from the operation means, determines the starting point position shifted from the reference position based on the detection signal received from the detection means, makes the image processing means generate the trajectory image of the discharge body heading from the starting point position toward the ending point position, and displays the trajectory image on the display unit.

DESCRIPTION OF DRAWINGS

FIG. 5 is a diagram for explaining the positional relationship of the firing position of the bullet in the virtual space and the object such as an enemy character disposed in the virtual space;

FIG. 7 is a flowchart for explaining the procedures of image generation processing; and FIG. 8 is a diagram showing a display example of the game image.

DETAILED DESCRIPTION

Embodiments of the present invention are now explained with reference to the drawings.

Figure 1:
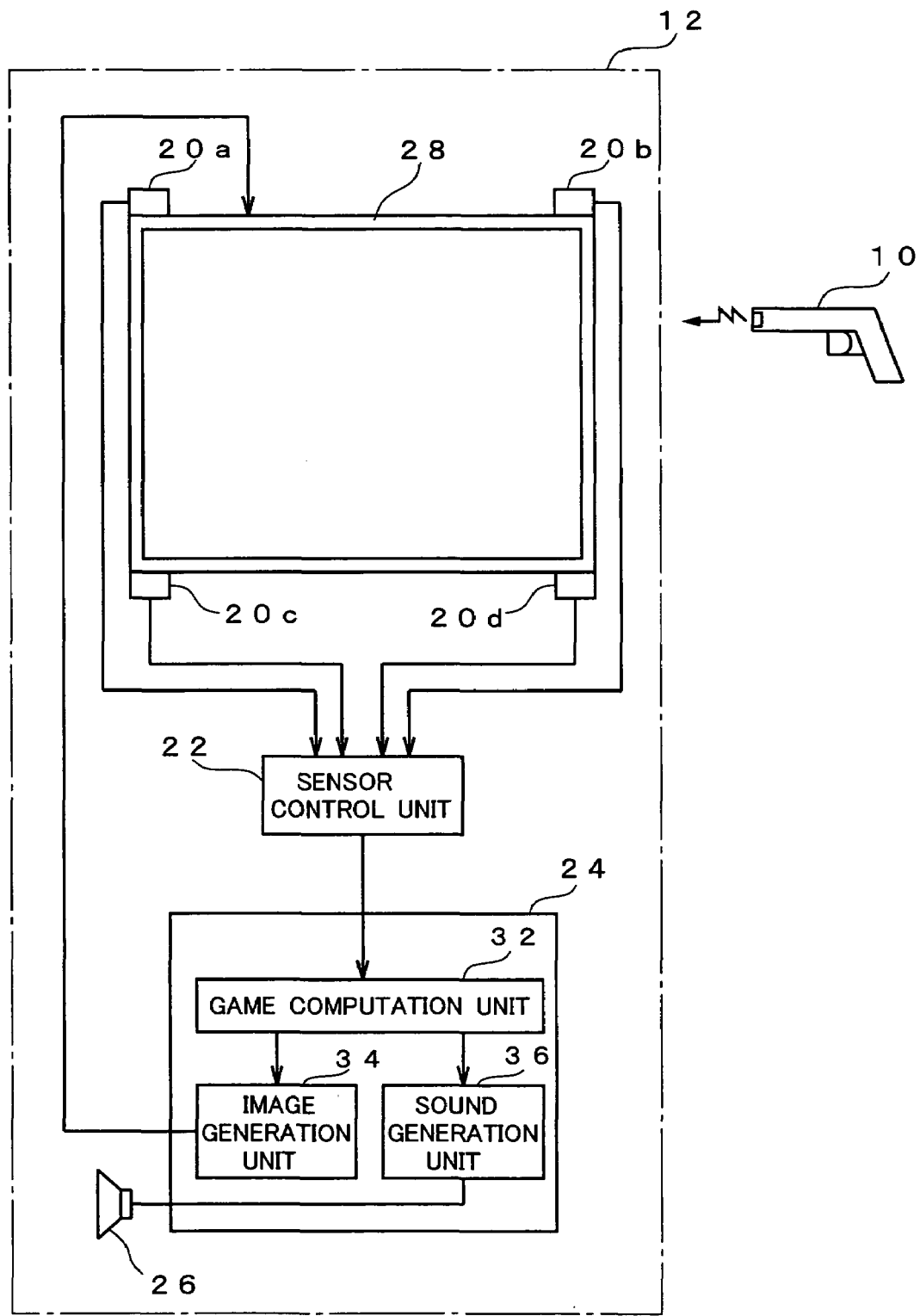
FIG. 1 is a diagram for explaining the constitution of the game device according to an embodiment employing the present invention.

FIG. 1 is a diagram for explaining the constitution of the game device according to an embodiment employing the present invention. The game device 100 shown in FIG. 1 is for a player (operator) to play a shooting game while watching the game image displayed three-dimensionally on a monitor (display unit) 28, and is constituted by including a gun-shaped controller 10 and a game device body 12.

The gun-shaped controller 10 is an operational means having a shape imitating the appearance of various types of guns (e.g., machine gun, pistol, rifle, shotgun, laser gun, etc.). The gun-shaped controller 10 is in a wireless state in which a connection cable is not provided between the game device body 12, and the player is able to freely operate such controller without being subject to any restraints regarding the operational area. The transfer of signals and the like between the game device body 12 and the gun-shaped controller 10 is conducted via wireless communication. Thus, the gun-shaped controller 10 has a light emission unit at the front of the case (near the muzzle), and emits an infrared signal from such light emission unit. The infrared signal corresponds to the detectable wave subject to detection by the respective sensors 20a to 20d. Incidentally, in addition to infrared light, electromagnetic waves of various wavelengths such as visible light, or sound waves, may be used to transmit the detectable wave. Further, the gun-shaped controller 10 of the present embodiment performs control for changing the state of the detectable wave output from the light emission unit in accordance with the content of operational instructions (e.g., whether the trigger has been pulled). For instance, control for making the detectable wave flash as a pulse is performed, and the content of the operational instruction is overlapped with the detectable wave by varying this flashing state and expressing a digital signal (serial signal).

The game device body 12 is constituted by including a plurality of sensors 20a to 20d, a sensor control unit 22, a game control unit 24, a speaker 26, and a monitor 28.

Each of the respective sensors 20a to 20d is disposed in the vicinity of the four corners of the screen 28a of the monitor 28, detects the intensity of the detectable wave (infrared signal) transmitted from the gun-shaped controller 10, and outputs the detection result to the sensor control unit 22. The respective sensors 20a to 20d in the present embodiment have sensor planes (detector planes) disposed toward three mutually different directions. Details regarding the disposition of the sensors 20a to 20d will be described later.

The sensor control unit 22 calculates the position and direction of the gun-shaped controller 10 in the real space based on the ratio of the intensity of the detectable wave detected respectively with the plurality of sensors 20a to 20d. Details regarding the calculation method of the position and direction with the sensor control unit 22 will be described later.

The game control unit 24 sets the game progress and generates a game image in correspondence with the content of the operational instruction input with the gun-shaped controller 10, and the position and/or direction of such gun-shaped controller 10, and contains the respective functional blocks of the game computation unit 32, image generation unit 32 and sound generation unit 34. This game control unit 24 is constituted with a computer equipped with the likes of a CPU, ROM, RAM and the like, and a prescribed program contained therein. Specific examples will be described later.

The game computation unit 30 is used for performing the various computations required in the game progress, and performs processing for setting the behavior of various objects (e.g., enemy character and the like) in the virtual space upon reflecting the operational instruction input with the gun-shaped controller 10 and the position and/or direction of the gun-shaped controller 10 calculated with the sensor control unit 22. Although the details will be described later, this game computation unit 30 corresponds to the "position/direction substitution means", "starting point/ending point setting means" or "control means".

The image generation unit (image processing means) 34 generates a two-dimensional image (game image) viewed from a virtual viewpoint in the game space in correspondence with the computation result of the game computation unit 30. The game image generated with this image generation unit 32 is displayed on the monitor 28.

The sound generation unit 34 generates various game sounds (e.g., explosion sounds and background music) required for the game progress in correspondence with the computation result of the game computation unit 30. The game sound generated with this sound generation unit 34 is output from the speaker 26.

Figure 2:
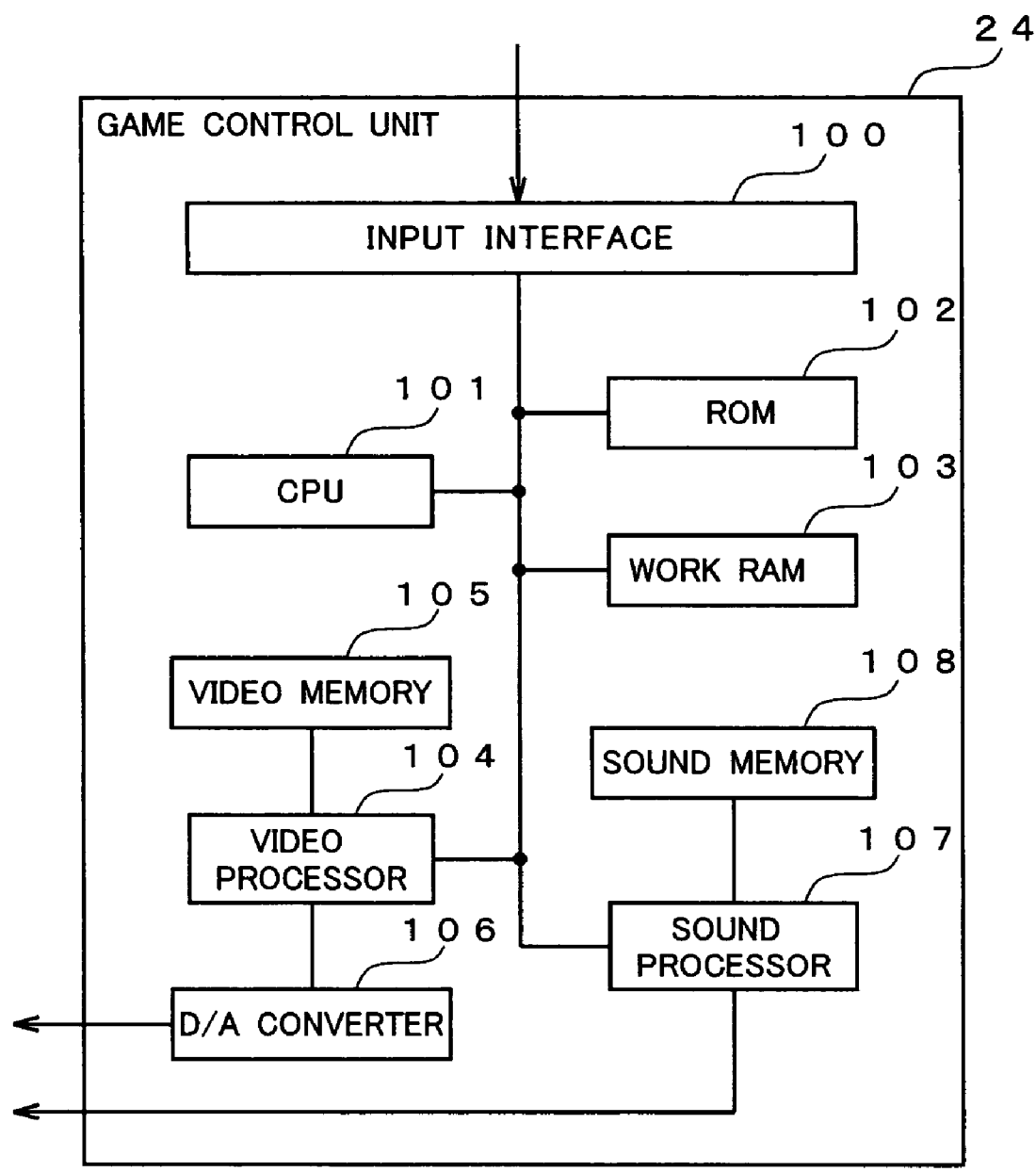
FIG. 2 is a diagram for explaining a specific example of the hardware constitution that realizes the game control unit.

FIG. 2 is a diagram for explaining a specific example of the hardware constitution that realizes the game control unit 24. The game control unit 24 shown in FIG. 2 is constituted by including an input interface 100, a CPU 101, a ROM 102, a work RAM 103, a video processor 104, a video memory 105, a digital/analog (D/A) converter 106, a sound processor 107, and a sound memory 108.

The input interface 100 receives information regarding the position and direction of, and the firing of bullets from, the gun-shaped controller 10 from the sensor control unit 22, and writes such information (data) in a prescribed address of the work RAM 103.

The CPU 101 executes the game program read out from the ROM 102 and written into the work RAM 103, and performs game computation for setting the game progress and so on.

Moreover, the CPU 101 determines the coordinate value (coordinate value in the world coordinate system) of an object such as the various characters or structures in the game space according to the set game progress, and performs processing (projective transformation) for projecting this coordinate value in the coordinate value in a visual field coordinate system with a prescribed conversion matrix.

The ROM 102 stores the foregoing game program and various data (e.g., polygon data, texture data, etc.) used in the game computation. The work RAM 103 is a random access memory that functions as a work area for temporarily storing various data upon the CPU 101 performing game computation.

The video processor 104 laminates texture to the various objects converted into a visual field coordinate system and generates drawing data corresponding to the game image to be displayed in the subsequent frame, and writes this in the video memory 105. Further, the video processor 104 reads from the video memory 105 the drawing data corresponding to the game image to be displayed in the current frame and outputs this to the D/A converter 106. As a result of this drawing data being converted into an analog video signal with the D/A converter 106 and output to the monitor 28, a game image is displayed on the screen of the monitor 28.

The sound processor 107 generates sound data for providing sound effects corresponding to the game progress and writes this into the sound memory 108, and further reads sound data from the sound memory 108 as required and converts such sound data into an analog sound signal, and outputs this to the speaker 26. Game sound is output from the speaker 26 based on the foregoing sound signal.

Next, the method of calculating the position and direction of the gun-shaped controller 10 is explained in detail.

Figure 3A:
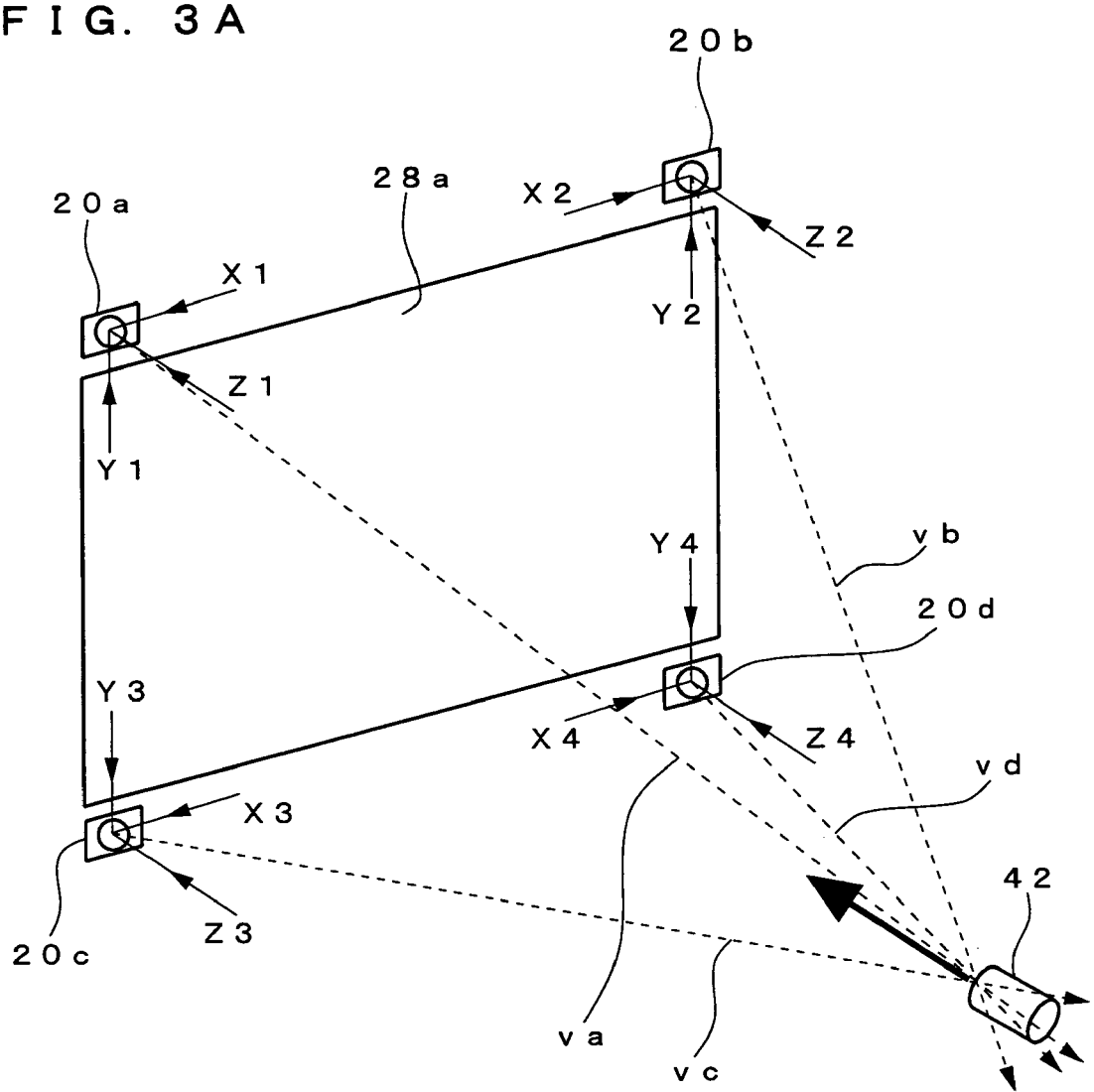
FIG. 3 (A) and FIG. 3 (B) are diagrams for explaining the calculation method of the position and direction of the gun-shaped controller.
Figure 3B:
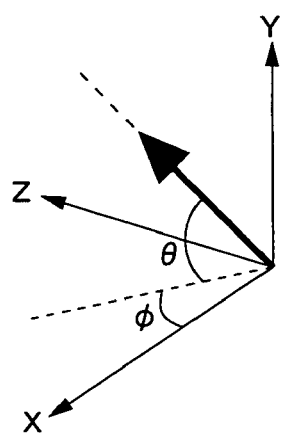

FIG. 3(A) and FIG. 3(B) are diagrams for explaining the calculation method of the position and direction of the gun-shaped controller. Specifically, FIG. 3(A) shows the spatial positional relationship of the gun-shaped controller and the respective sensors, and FIG. 3(B) shows the definition of the vectors indicating the direction of the gun-shaped controller.

As shown in FIG. 3(A), each of the sensors 20a to 20d is disposed in the vicinity of the four corners of the screen 28a of the monitor 28. In detail, the sensor 20a is disposed at the upper left of the screen 28a, the sensor 20b is disposed at the upper right of the screen 28a, the sensor 20c is provided at the lower left of the screen 28a, and the sensor 20d is disposed at the lower right of the screen 28a. In this example, basically, the area surrounded by these sensors 20a to 20d will be the detection area. This detection area is the area to be aimed with the gun-shaped controller 10. Although this will also depend on the sensitivity of each sensor, the area in which the respective sensors are able to detect the detectable wave transmitted from the gun-shaped controller 10 shall be an area that is wider than the foregoing detection area.

The respective sensors 20a to 20d have three sensor planes disposed toward mutually different directions, and these three sensor planes are respectively facing the X direction (horizontal direction), Y direction (vertical direction), and Z direction (depth direction). Each of the sensors 20a to 20d detects, with the three sensor planes, the intensity (amount of entering infrared light in this example) of the detectable signal in the X, Y, Z directions transmitted from the gun-shaped controller 10.

The sensor control unit 22 seeks the three-dimensional direction vector representing the position of the gun-shaped controller 10, with the disposed position of each sensor 20a to 20d as the basic point, based on the ratio of the amount of entering light in the X, Y, Z directions of the respective sensors 20a to 20d. As shown in the diagram, the direction vector va corresponding to the sensor 20a, the direction vector vb corresponding to the sensor 20b, the direction vector vc corresponding to the sensor 20c, and the direction vector vd corresponding to the sensor 20d are respectively sought. As a result of synthesizing these direction vectors va, vb, vc and vd, the position of the controller can be obtained as a three-dimensional coordinate value (x, y, z). Further, the direction of the controller is obtained as two angles; namely, angle $\theta$ formed with the XZ plane, and angle $\phi$ formed with the XY plane.

Here, so as long as the direction vector with sensors in at least two locations as the basic point is known, the position of the gun-shaped controller 10 can be known. Moreover, when the gun-shaped controller 10 emits light at an arbitrary position toward an arbitrary direction, the ratio of the amount of entering light in each sensor 20a to 20d will be determined uniquely. Therefore, the sensor control unit 22 calculates the direction to which the gun-shaped controller 10 is facing based on the ratio of the amount of entering light in relation to the respective sensors 20a to 20d. Incidentally, although the direction of the gun-shaped controller 10 may be suitably defined, for instance, it would be desirable to make it correspond to the direction of the barrel of the gun.

Figure 4:
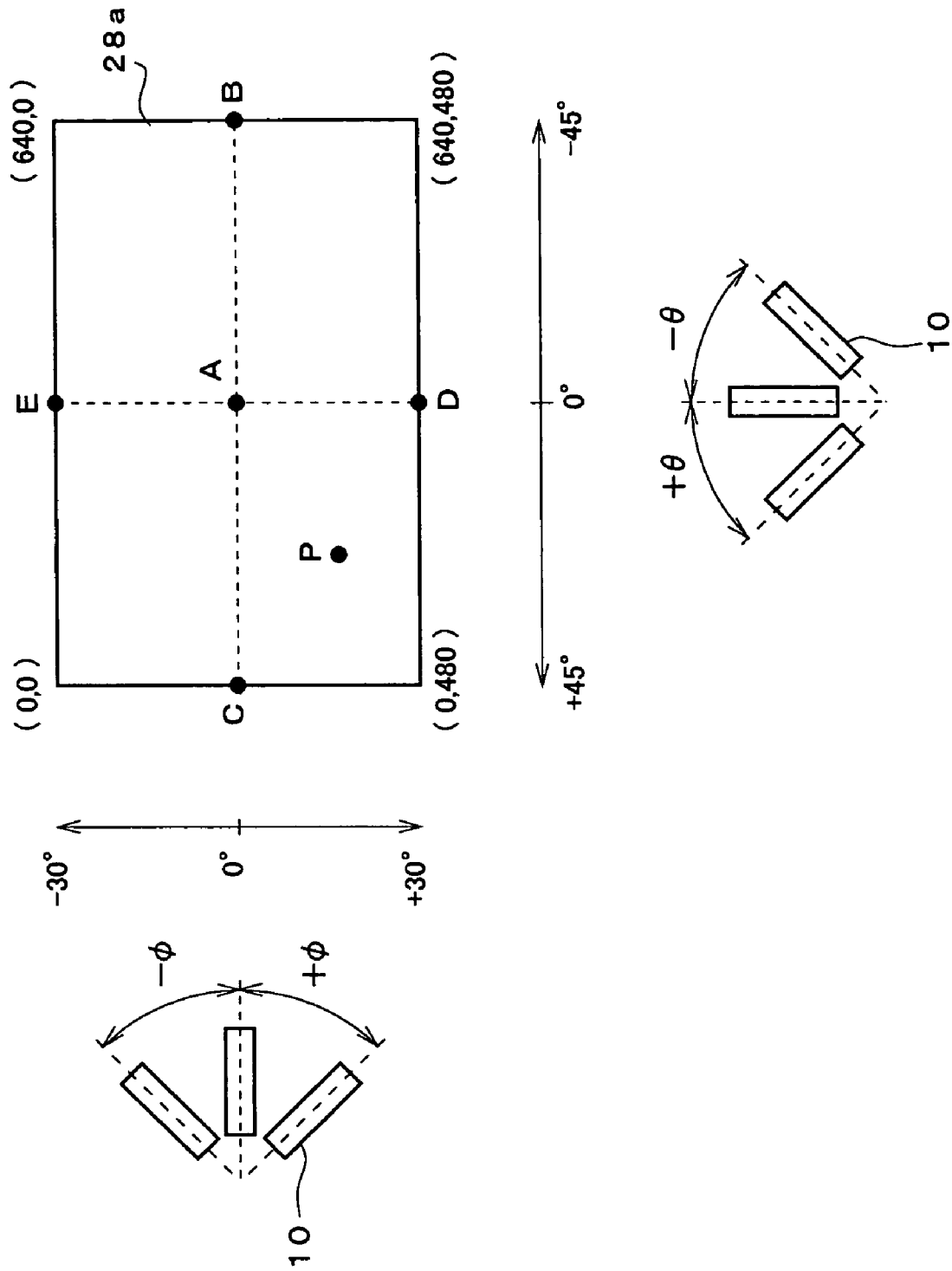
FIG. 4 is a diagram for explaining another example of the calculation method of the position and direction of the gun-shaped controller.

FIG. 4 is a diagram for explaining the calculation method of the firing point on the screen. In this example, the position (coordinate) on the screen 28a of the monitor 28 and the entering angle to such position are sought based on the angle of the gun-shaped controller.

For example, let it be assumed that the resolution of the screen 28a is 640×480 dots (VGA equivalent). When the respective positions on the screen are represented with (x, y) coordinates based on the X-Y axis with the upper left part of the screen 28a as the point of origin, as shown in the diagram, screen center A (320, 240), screen center right edge B (640, 240), screen center left edge C (240, 0), screen center lower edge D (320, 480), and screen center upper edge E (320, 0) can be respectively represented. Further, the area capable of detecting the angle of the gun-shaped controller is set forth. For instance, in this example, the vertical angle of the gun-shaped controller is set to −30° to +30°, and the lateral angle is set to −45° to +45°. Under these conditions, the correspondence of the angle of the gun-shaped controller and the firing point is determined.

When the vertical angle and lateral angle of the gun-shaped controller are both 0°, since the gun-shaped controller is perpendicular to the screen, point A (320, 240) is set as the "firing point".

When the vertical angle of the gun-shaped controller is 0° and the lateral angle is +45°, point B (640, 240) is set as the "firing point".

When the vertical angle of the gun-shaped controller is 0° and the lateral angle is −45°, point C (0, 240) is set as the "firing point".

When the vertical angle of the gun-shaped controller is −30° and the lateral angle is 0°, point D (320, 480) is set as the "firing point".

When the vertical angle of the gun-shaped controller is +30° and the lateral angle is 0°, point E (640, 240) is set as the "firing point".

Although the foregoing values represent the coordinates of the firing point on the screen corresponding to the maximum values of the vertical angle or lateral angle, with respect to intermediate positions, coordinates according to the continuously changing vertical angle or lateral angle are calculated.

The vertical and lateral angles of the gun-shaped controller corresponding to the arbitrary firing point P (x, y) on the screen shall be (θ, φ).

In each of the foregoing methods described above, when the position and direction of the gun-shaped controller 10 are calculated as described above, it will be possible to determine where on the screen 28 and from what angle the player using the gun-shaped controller 10 is aiming, and the distance of the player (far or near) to the screen can also be determined. Therefore, the spatial position and direction (relative position in the real space) of the gun-shaped controller 10 in relation to the monitor 28 can be substituted with a position in the virtual space to determine the relative positional relationship (distance, direction) of the object existing in such virtual space and the gun-shaped controller 10, and various game presentations can be made upon utilizing such judgment result.

Next, the processing for generating a game image (two-dimensional image) including the trajectory of a bullet to be virtually fired from the gun-shaped controller is explained.

Figure 6:
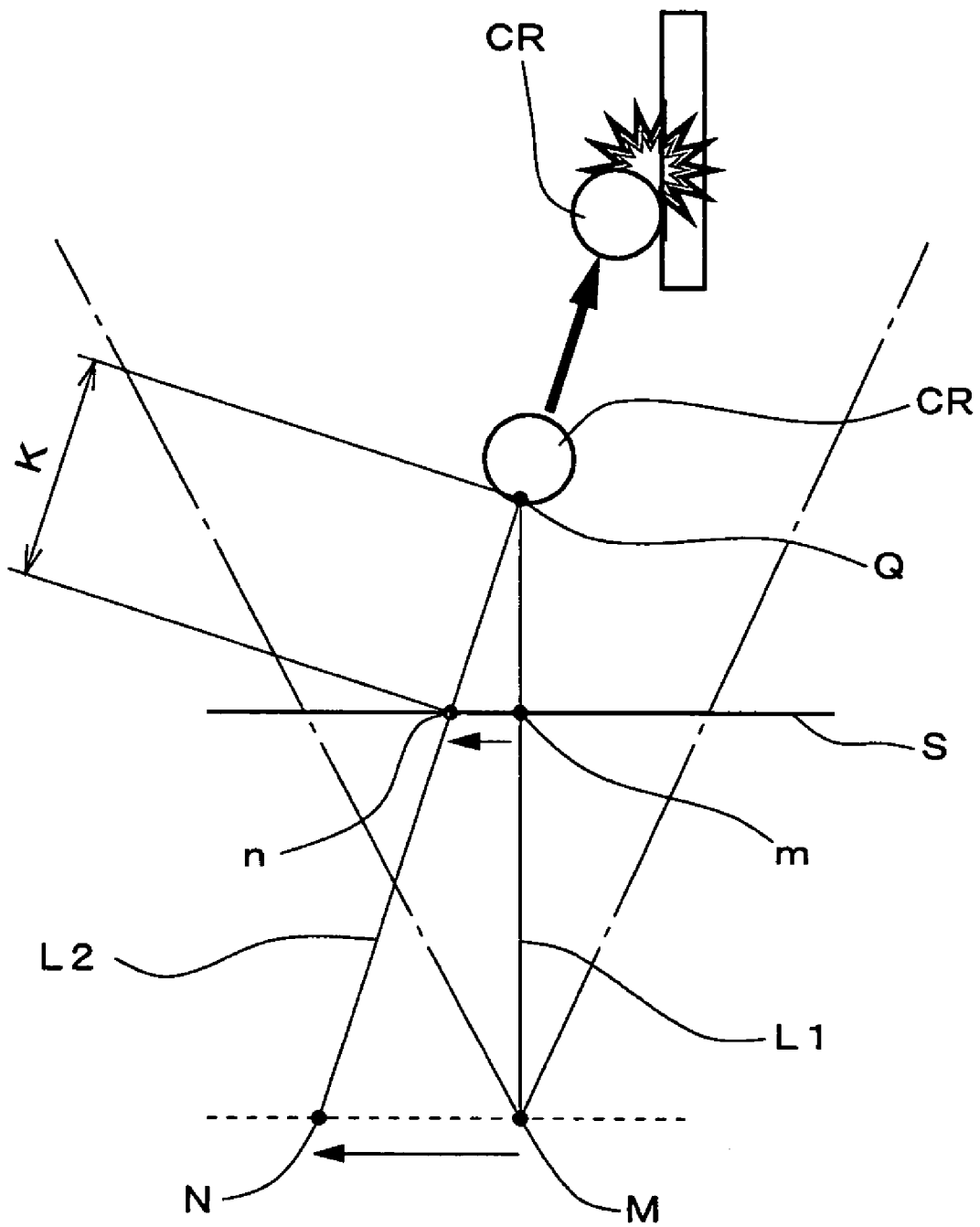
FIG. 6 is a diagram for explaining the positional relationship of the firing position of the bullet in the virtual space and the object such as an enemy character disposed in the virtual space.

FIG. 5 is a diagram for explaining the positional relationship of the firing position of the bullet in the virtual space and the object such as an enemy character disposed in the virtual space. FIG. 6 is a plan view of the virtual space shown as a frame format in FIG. 5.

Foremost, the firing position M of the bullet in the virtual space is determined based on the respective methods described above. The firing point detected based on the monitor 28 is m, and this firing point m is comprehended as a point on the surface of the projection plane S upon generating the two-dimensional image. By simulating the virtual line L1 extending from this firing position M or firing point m along the direction in the virtual space designated with the gun-shaped controller 10, the impact point (ending point) Q is set at a prescribed position on such virtual line L1. As shown in FIG. 5, when a target object CR (e.g., enemy character) intersecting with the virtual line L1 is disposed in the virtual space, the intersecting point of the target object CR and virtual line L1 will be set as the impact point Q. Further, when a target object intersecting with the virtual line L1 does not exist in the virtual space, an appropriate position, for instance, a position on the extension of the virtual line L1 at an extremely far distance (an approximate infinite distance) is set as the impact point Q. That is, in the present embodiment, impact judgment is made while giving consideration to the position and direction of the gun-shaped controller 10.

Next, a starting point N is set to a position where the firing position of the gun-shaped controller in the virtual space is shifted a prescribed amount in the horizontal direction (lateral direction). Incidentally, the direction of shifting the starting point position N is not limited to the horizontal direction, and the vertical direction may also be included. Here, the virtual viewpoint (camera viewpoint) for generating the two-dimensional image is set to approximately match the barrel of the gun-shaped controller 10; that is, the position and direction of the gun-shaped controller in the virtual space. In other words, the position of point M in FIG. 5 and FIG. 6 will become the virtual viewpoint. Thereby, the two-dimensional image generated pursuant to the projective transformation of the virtual space will become a so-called first person point of view. Thereupon, a trajectory object covering a part or the entirety of the zone K connecting the impact point Q and starting point position N is set in the virtual space. As a result, the trajectory object is subject to projective transformation so as to obtain a linear image, and this will be contained in the two-dimensional image.

Incidentally, the virtual viewpoint may be set at a position of shifting the position of point M upward a prescribed distance so as to make the virtual viewpoint closer than the operator's viewpoint.

Further, as shown in FIG. 6, it is preferable to associate the behavior of the target object (enemy object) after impact in the direction along the virtual line L2. For example, when the direction of the target object hit with the bullet being blown away is set to a direction along the virtual line L2, this is preferable since such direction will match the direction of the bullet trajectory.

In the game device 100, the player is able to perform two main operations for playing a shooting game of aiming at enemies with the gun-shaped controller 10. One such operation is to determine what position on the screen 28*a* is to be aimed (role 1), and the other operation is to determine the position and visual direction of the virtual viewpoint (role 2). This is explained in detail below.

When the player moves the gun-shaped controller 10, the game computation unit 30 acquires at least one type of information of either the position or angle of the gun-shaped controller 10 in accordance therewith, and determines the position and visual direction of the virtual viewpoint in the virtual space from the position information and/or angle information.

The foregoing processing is performed in a prescribed interval (e.g., for each frame or for every 1/60 sec.), and, when the player moves the gun-shaped controller 10, the position and visual direction of the virtual viewpoint will change in accordance therewith. Therefore, a simulated three-dimensional image (projected two-dimensional image) of the virtual space viewed from the virtual viewpoint is generated in real time, and an ever-changing image will be displayed on the monitor.

When a target object exists in the area in the virtual space viewed from the virtual viewpoint of the viewpoint coordinate system determined as described above (c.f. FIG. 5), a simulated three-dimensional image (two-dimensional image) in which the target object is projected on the projection plane S will be displayed on the monitor.

Next, the player will position the gun-shaped controller 10 toward the screen 28*a* so as to aim at the target object displayed on the screen 28*a*. Here, the game computation unit 30 acquires at least one type of information of either the position information or angle information of the gun-shaped controller 10 from the sensor control unit 22, and calculates the position where the player is aiming on the screen 28*a*.

Here, upon performing the foregoing processing, when the gun-shaped controller 10 is to be used for shooting, various processing routines such as (1) the method of switching the "viewpoint change mode (role 1)" and "shooting mode (role 2) pursuant to prescribed conditions, (2) method of switching the "viewpoint change mode (role 1)" and "shooting mode (role 2)" according to the player's operation, and (3) method of not switching the modes may be performed.

(1) Method of Switching Modes Pursuant to Prescribed Conditions

Conditions on whether to switch to the shooting mode are set (programmed) in advance, and, when such conditions are satisfied, the operation of the virtual viewpoint by the player moving the gun-shaped controller 10 will be made invalid. In other words, the viewpoint coordinate system is determined at the point the conditions are satisfied. As a result, since the viewpoint will not be changed in accordance with the movement of the gun-shaped controller 10, the player will be able to move the gun-shaped controller 10 while watching an image of a stable viewpoint, and aim at a prescribed position on the screen 28a. Conditions for switching modes, for instance, may be whether a target object exists in a prescribed area in the virtual space viewed from the virtual viewpoint. Here, the game computation unit 30 may perform the processing of judging whether a target object exists in a prescribed area from the coordinates of such target object in the virtual space, and switching to the shooting mode when such target object exists.

(2) Method of Switching Modes According to Player's Operation

Whether to switch to the shooting mode may also be determined with the game computation unit 30 based on the player's operation signal. Specifically, a switching button (switching means) is provided to the gun-shaped controller 10. When the player presses the switching button and the game computation unit 30 receives a switch operation signal sent from the gun-shaped controller 10, the [game computation unit 30] switches to the shooting mode. After switching to the shooting mode, operation of the virtual viewpoint based on the player moving the gun-shaped controller 10 will be made invalid. In other words, even upon acquiring the position and/or angle information of the gun-shaped controller 10, the game computation unit 30 will not perform processing of changing the position and visual direction of the virtual viewpoint of the virtual space according to such information, and generating a perspective transformation image viewed from the changed virtual viewpoint. Here, the viewpoint coordinate system will be determined when the player presses the switching button and the operation signal is received. Thereby, since the virtual viewpoint will be changed by following the movement of the gun-shaped controller 10, the player will be able to operate the gun-shaped controller 10 while watching an image of a stable viewpoint so as to aim at a prescribed position on the screen 28a.

(3) Method of Not Switching Modes

Each time the player positions the gun-shaped controller 10 against the screen 28a and points the muzzle toward the screen 28a at a prescribed angle so as to aim at the target object displayed on the screen 28a, the game computation unit 30 acquires at least either the position information or angle information of the gun-shaped controller 10 from the sensor control unit 22, and determines the position on the screen where the player is aiming with the gun-shaped controller 10, and the position and visual direction of the virtual viewpoint in the virtual space. Therefore, when the player moves the gun-shaped controller 10, the position and visual direction of the virtual viewpoint will follow such movement and be changed, and the simulated three-dimensional image (two-dimensional image) after the changed viewpoint coordinate system is subject to perspective transformation is displayed on the screen 28a. Simultaneously, since the positional coordinates on the screen 28a to which the player is aiming the gun-shaped controller 10 will also change, impact judgment processing with the target object will be performed based on such changed positional coordinates. Here, the player will be demanded of more sophisticated operational skills, the difficulty of the game will increase thereby, and a game that will appeal to players of high operational skills (experiences players) can be provided.

Next, the display of the bullet trajectory in the foregoing "shooting mode" is explained. In the foregoing shooting mode, since the virtual viewpoint in the virtual space will not be changed even when the player moves the gun-shaped controller 10, the [player] will be able to play the shooting game by operating the gun-shaped controller 10 while watching the screen with a stable viewpoint and aiming at a prescribed position on the screen 28a. The game computation unit 30 acquires at least either the position information or angle information of the gun-shaped controller 10 from the sensor control unit 22, and determines the position and visual direction of the virtual viewpoint M in the virtual space. FIG. 5 shows a state where a target object exists in the visible area in the virtual space viewed from the determined virtual viewpoint M of the viewpoint coordinate system.

The virtual viewpoint M is set to a position at the eye line of the player character object when assuming that a player character object exists in the virtual space. Therefore, the image of the player character operated by the player will not be displayed on the screen 28a of the monitor 28, and will be displayed as a so-called first person point of view image (c.f. FIG. 8).

Here, a virtual muzzle position (bullet firing position) is set at a position that is approximately the same as the virtual viewpoint M of the virtual space, and, when the game computation unit 30 receives a trigger input signal pursuant to the player's operation from the gun-shaped controller 10, it assumes that a discharge body (bullet for example) has been fired from the firing position of the virtual space, and performs collision judgment with the target object CR.

The game computation unit 30 acquires at least either the position information or angle information from the sensor control unit 22, and determines the position on the screen 28a where the player is aiming with the gun-shaped controller 10. Next, the position m on the perspective projection plane S of the viewpoint coordinate system of the virtual viewpoint M in the virtual space corresponding to the position aimed on the screen 28 determined above is calculated. A virtual line L1 extending along the direction heading from the virtual viewpoint M toward the coordinate m on the projection plane S is simulated, and collision judgment with the target object CR is performed based on this virtual line L1. As shown in the diagram, when a target object CR (e.g., target body such as an enemy character) intersecting with the virtual line L1 is disposed in the virtual space, the intersecting point of the target object CR and virtual line L1 will be set as the impact point Q. Further, when a target object intersecting with the virtual line L1 does not exist in the virtual space, an appropriate position, for instance, a position on the extension of the virtual line L1 at an extremely far distance (an approximate infinite distance) is set as the impact point Q. That is, in the present embodiment, impact judgment is made while giving consideration to the position and direction of the gun-shaped controller 10. Incidentally, the impact judgment processing may be conducted based on the comparison of the position m on the perspective projection plane S of the viewpoint coordinate system of the virtual viewpoint M, and the impact judgment area set forth in the target object CR projected on such perspective projection plane S.

Next, the display of trajectory is explained. When the game computation unit 30 receives a trigger input signal based on the player's operation from the gun-shaped controller 10, it performs the foregoing impact judgment processing, and further performs image generation processing for displaying the bullet trajectory on the monitor 28. Specifically, when the game computation unit 30 receives a trigger input signal based on the player's operation, it determines the impact point Q (ending point position) in the virtual space by acquiring at least either the position information or angle information from the sensor control unit 22. Next, a position (starting point position) shifted from the firing position (or virtual viewpoint M) of the virtual space is determined. The starting point position is sought by calculating the distance to be shifted according to the acquired angle information. The direction to be shifted is also calculated according to the acquired angle information. And, processing such as rendering is performed so as to display on the screen 28a of the monitor 28 the trajectory image of a bullet heading from the starting point position N, after being shifted a prescribed amount, toward the foregoing impact point Q (ending point position). For example, a trajectory object covering a part of the virtual line L2 connecting the impact point Q and starting point N; that is, a part or the entirety of the zone K, is disposed in the virtual space. Thereby, the trajectory object is subject to perspective transformation on the projection plane S of the viewpoint coordinate system of the virtual viewpoint M, and a two-dimensional image containing the trajectory image is generated and displayed.

Here, the method of calculating the "starting point position N after being shifted a prescribed amount" is explained in detail. The image data generated by an object in the virtual space being projected on the projection plane S of the virtual viewpoint coordinate system with the image generation unit 32 is stored in the frame buffer (video memory 105) in the image generation unit 32. And, the image data written in the frame buffer is read out in a prescribed timing, sent from the image generation unit 32 to the monitor 28, and displayed as an image on the screen 28a. For example, let it be assumed that the resolution of the screen 28a is 640×480 dots (VGA equivalent). When the respective positions on the screen are represented with (x, y) coordinates based on the X-Y axis with the upper left part of the screen 28a as the point of origin, as shown in the diagram, screen center A (320, 240), screen center right edge B (640, 240), screen center left edge C (240, 0), screen center lower edge D (320, 480), and screen center upper edge E (320, 0) can be respectively represented. The frame buffer is able to store the image data is a size corresponding to above, and the image information of each dot is stored in each address set in correspondence with the respective coordinates on the screen.

An area capable of detecting the angle of the gun-shaped controller is set forth. For instance, in this example, the vertical angle of the gun-shaped controller is set to −30° to +30°, and the lateral angle is set to 45° to +45°. When the gun-shaped controller 10 is perpendicular to the screen 28a; that is, when the vertical angle and lateral angle of the gun-shaped controller are both 0°, the starting point position N (FIG. 5) is set such that the amount to be shifted from the firing position M (or viewpoint position M) becomes 0. In other words, the positional relationship of the starting point position and reference position M will be maintained without change from the state of initial setting. Under these conditions, the correlation of the angle of the gun-shaped controller and the starting point position N in the virtual space is determined.

The firing point on the screen; that is, the point where the trajectory display begins (display starting point) is set as P. The vertical and lateral angles of the gun-shaped controller corresponding to the arbitrary firing point P (x, y) on the screen shall be (θ, φ). Further, point A shows the center position (320, 240) on the screen. When the vertical angle and lateral angle of the gun-shaped controller 10 are both 0°, since the gun-shaped controller 10 is in a state of being perpendicular to the screen 28a, the starting point position N (c.f. FIG. 5) set in the virtual space is set to the viewpoint position M. Incidentally, when the vertical angle and lateral angle of the gun-shaped controller 10 are both 0°, and the gun-shaped controller 10 exists at a position facing the center position of the screen 28a, point A (320, 240) is set as the display starting point, and the trajectory of the bullet in the two-dimensional image subject to perspective transformation in the viewpoint coordinate system of the virtual viewpoint M is displayed in a "point" pattern. In other words, when the vertical angle and lateral angle of the gun-shaped controller 10 are both 0°, an image (bullet trajectory) of "points" is displayed at the position of the screen 28a facing the gun-shaped controller 10.

When the vertical angle of the gun-shaped controller 10 is 0°, and the lateral angle thereof is +45°, the amount to be shifted is calculated such that the point B (640, 240) will become the display starting point, and the starting point position N (FIG. 5) is set to a position shifted from point M in the horizontal direction.

When the vertical angle of the gun-shaped controller 10 is 0°, and the lateral angle thereof is −45°, the amount to be shifted is calculated such that the point C (0, 240) will become the display starting point pursuant to a prescribed algorithm, and the starting point position N (FIG. 5) is set to a position shifted from point M in the horizontal direction.

When the vertical angle of the gun-shaped controller 10 is −30°, and the lateral angle thereof is 0°, a prescribed amount is calculated such that the point D (320, 480) will become the display starting point, and the starting point position N (FIG. 5) is set to a position shifted from point M in the vertical direction.

When the vertical angle of the gun-shaped controller 10 is +30°, and the lateral angle thereof is 0°, the amount to be shifted is calculated such that the point E (640, 240) will become the display starting point, and the starting point position N (FIG. 5) is set to a position shifted from point M in the vertical direction.

Although the foregoing values represent the coordinates of the display starting point on the screen corresponding to the maximum values of the vertical angle or lateral angle, with respect to intermediate positions, the prescribed amount to be shifted or the direction according to the continuously changing vertical angle and/or lateral angle are calculated with the game computation unit 30. In other words, the game computation unit 30 calculates the amount to be shifted from point M in the virtual space to the horizontal and/or lateral direction pursuant to a prescribed algorithm such that the arbitrary point P (x, y) on the screen 28a will become the display starting point, and the starting point position N (c.f. FIG. 5) after being shifted a prescribed amount from such reference point M is determined thereby. Therefore, when the vertical angle is 0° and the lateral angle is 22.5°, the player will see the display starting point being displayed at an intermediate point between point A and point B on the monitor screen.

Incidentally, although the starting point position N of the trajectory shifted a prescribed amount from the coordinates of the firing position M (or virtual viewpoint M) set in the virtual space was determined based on the angle information of the gun-shaped controller 10, the amount to be shifted may also be calculated based on the position information, or both the angle information and position information.

Further, in order to seek the starting point position N shifted a prescribed amount from the coordinates of the firing position M (or virtual viewpoint M) set in the virtual space, the game computation unit 30 may calculate this in real time by acquiring information of at least either the position or direction of the gun-shaped controller 10, or a table prescribing the amount to be shifted for each area of position or angle may be pre-stored in a memory, and this may be selected from the table according to the current angle or position of the gun-shaped controller 10.

Further, the present invention may also be used in cases when the viewpoint position in the virtual space and the firing position of the bullet do not match. For example, when the vertical angle and lateral angle of the gun-shaped controller 10 are both 0°, the firing position of the bullet in the virtual space is set as the initial position of the starting point position, and the positions of the viewpoint position and starting point position (firing position) in the virtual space are set so as to maintain a prescribed distance. And, in accordance with the vertical angle and/or lateral angle, the amount to be shifted and the direction are determined with the game computation unit 30, and the starting point position is shifted in relation to the firing position (or viewpoint position) so as to display the foregoing trajectory image.

With the foregoing method, it will be possible to determine where and from what angle the player using the gun-shaped controller 10 is aiming on the screen 28*a*. Further, the distance (near or far) of the player to the screen can also be judged. Therefore, presentation of various games utilizing the judgment result will be possible.

As shown in FIG. 6, it is preferable to associate the behavior of the object such as an enemy object after impact in the direction along the virtual line L2. The method of seeking the virtual line L2 is the same as the method of seeking the trajectory display described above, and the starting point position is set forth by calculating the amount to be shifted from the reference position based on at least the position or angle information of the gun-shaped controller 10. For example, when it is judged that a collision occurred in the impact judgment processing of the enemy character and bullet in the virtual space, the enemy character object is controlled so as to move in the direction along the virtual line L2, and a simulated three-dimensional image subject to the perspective transformation on the projection plane S of the viewpoint coordinate system of the virtual viewpoint M. As a result, this is visually preferable since the player will see the enemy character being blown away in a direction coinciding with the trajectory of the bullet.

Next, procedures of the image generation processing in the game device of the present embodiment are explained. FIG. 7 is a flowchart for explaining the procedures of the image generation processing. The series of processing steps illustrated in FIG. 7 are repeated for each prescribed interval (e.g., 1/60 seconds) during the game progress. Incidentally, the order of each of the processing steps shown below may be suitably interchanged, or a plurality of steps may be performed in parallel so as long as there is no discrepancy in the processing content.

When a detectable wave is transmitted from the gun-shaped controller 10 and the intensity thereof is detected with the respective sensors 20*a* to 20*d*, the sensor control unit 22 detects at least either the relative position or direction (orientation) in the real space of the gun-shaped controller 10 based on the intensity of the detectable wave detected with the respective sensors 20*a* to 20*d*, and detects the contents of the operational instructions based on the state of the detectable wave (Step S100).

The game computation unit 30 acquires the detection result of at least either the position of the gun-shaped controller 10 or the direction designated with such gun-shaped operational means from the sensor control unit 22 (Step S101). Specifically, a flag (data) showing the calculation results of the sensor control unit 22 is written in the work RAM 103 (c.f. FIG. 2) as needed, and information on the position or the like of the gun-shaped-controller 10 can be acquired by referring to such flag.

Next, the game computation unit 30 determines the position and visual direction of the virtual viewpoint in the virtual space based on at least either the position or direction of the gun-shaped controller 10 in the real space. Specifically, the position and visual direction of the virtual viewpoint in the virtual space are determined based on the position of the gun-shaped controller in the real space, horizontal direction angle θ and vertical direction angle φ. And, when the viewpoint coordinate system is determined, the control unit determines what position on the screen the player is aiming based on at least one type of information of either the position or direction of the gun-shaped controller 10 in the real space (Step S102).

Further, the game computation unit 30 determines whether the operator pulled the trigger or not based on the content of the operational instructions acquired at Step S101 (Step S103). When the trigger has not been pulled, a negative judgment (NO) is made, and the routine proceeds to Step S109 described later.

When the trigger has been pulled, a positive judgment (YES) is made at Step S103, and the game computation unit 30 determines whether the aim is on the target object such as an enemy character (Step S104). Specifically, the game computation unit 30 makes the judgment at Step S104 by checking whether a target object exists on the virtual line extending in the vector direction from the muzzle position (firing position) in the virtual space.

When the aim is on the target object, a positive judgment (YES) is made at Step S104, and the game computation unit 30 sets the impact point (ending point) at the intersecting point of the vector direction from the muzzle position (firing position) and target object in the virtual space (Step S105). When this kind of game computation is performed, and the processing routine of this example is ended, the target object such as an enemy character will be hit, and an image representing a corresponding reaction (e.g. damage, explosion, etc.) will be generated and displayed.

Further, when the aim is not on the target object, a negative judgment is made at Step S104, and the game computation unit 30 sets the impact point (ending point) at a suitable distance (e.g., approximate infinite distance) on the virtual line extending from the muzzle position (firing position) toward the vector direction (aiming direction) in the virtual space (Step S106). When this kind of game computation is performed, after the processing routing of this example is ended, an image representing a state of the target object such as an enemy character not being hit is generated and displayed.

Further, the game computation unit 30 calculates the amount to be shifted from the firing position (or virtual viewpoint) in the virtual space based on at least either the position or angle information of the gun-shaped controller 10 in the real space, and sets the starting point position upon drawing the trajectory image corresponding to the bullet trajectory (Step S107). In the present embodiment described above, although the starting point position is set by shifting (offsetting) it from the firing position in the horizontal direction, the starting point position may also be shifted in the vertical direction, or a combination of shifting in both the horizontal and vertical directions may also be employed.

Next, the image generation unit 32 disposes polygons covering a part or the entirety of the zone connecting the starting point and ending point set in each of the foregoing steps (Step S108). Then, the image generation unit 32 performs projective transformation with the viewpoint coordinate system of the virtual viewpoint determined with the foregoing methods so as to generate a two-dimensional image (Step S109). Here, as a result of the polygons disposed at the zone connecting the starting point and ending point being subject to projective transformation, a two-dimensional image containing the trajectory image expressing the bullet trajectory can be obtained. The two-dimensional image (game image) generated with this image generation unit 34 is sent to the monitor 28, and the game image is displayed on the screen 28a of the monitor 28. FIG. 8 is a diagram showing a display example of the game image. As shown in FIG. 8, for instance, a trajectory image W is displayed toward the enemy character CR in the virtual space, and a picture of the bullet trajectory is represented.

As described above, with the game device of the present embodiment, since the trajectory image is displayed at a part or the entirety of the zone starting from a position that is different from the virtual viewpoint, the trajectory will not be displayed in a point-like pattern in a two-dimensional image subject to projective transformation upon expressing the bullet trajectory. Therefore, in a shooting game adopting the first person point of view, the trajectory of the bullet heading from the player side toward the virtual space can be expressed more effectively.

Incidentally, the present invention is not limited to the contents of the embodiments described above, and may be modified variously within the scope of the gist of the invention.

For example, in the foregoing embodiments, although the relative position of the operational means and the relative direction designated with such operational means were detected based on the screen 28a of the monitor 28, this may be based on other parts.

Further, as a method of seeking the angle information of the gun-shaped controller 10, a gun-shaped controller having a tilt sensor or gyro may also be used. As a result, the starting point position of generating the trajectory can be sought from such tilt sensor or gyro. Here, as a substitute for the respective optically-based sensors described above, the scanning line upon displaying an image on the monitor 28 may be-read so as to calculate the position on the screen 28a of the monitor 28 where the player is aiming the gun-shaped controller. Or, an arrow key may be provided to the gun-shaped controller, and, by the game computation unit 30 receiving the operation signal therefrom, it will be possible to calculate the position on the screen 28a where the player is aiming the gun-shaped controller. As a result, it will also be possible to calculate the ending point position.

Further, the applicable scope of the present invention is not limited to a game device, and this invention may also be employed in various devices that display images by performing projective transformation to the situation in the virtual space and generating a two-dimensional image thereof. For example, in addition to the trajectory of a bullet, an effective display of images will be possible in various cases such as when pointing at a prescribed position in the virtual space with a laser pointer as the operational means. Moreover, the present invention may also be preferably applied to a virtual reality device (simulator) enabling the operator to experience the virtual reality of various situations. For instance, the [present invention] may be employed for enabling the operator to experience the virtual reality of shooting or firefighters to experience the virtual reality of fire fighting. In the case of a fire-fighting simulator, a fire hose-shaped controller may be used to express the trajectory image of the tail water. In addition, a sword-shaped controller may be used to express the trajectory image of the cut made by the sword.

According to the present invention, the effective expression of the trajectory of a bullet or the like heading from the operator side toward the virtual space is enabled in an image display device of games and so on adopting the first person point of view.

I claim:

1. An image generation device, comprising:
   image processing means configured to set a target object and a viewpoint in a virtual space, and to generate an image of said target object viewed from said viewpoint;
   a display unit configured to display said target object image;
   operational means to be operated by a player to perform a virtual shooting by aiming at said target object image displayed on said display unit;
   detection means to detect a shooting direction of said operational means in relation to said display unit; and
   control means configured to execute, when said player causes said operational means to fire, processing comprising:
      determining if a collision has occurred between a discharge body, which was virtually fired from a firing point set in said virtual space toward said target object image, and said target object, wherein the determining is in response to an operation signal indicating said shooting direction, said operation signal being provided from said operational means, and wherein said firing point is determined in said virtual space corresponding to a position at which said operational means is held by said player in front of said display unit;
      setting a starting point position by calculating a distance and a direction to be shifted from said firing point, based on angle information of said operational means, said starting point position being different from that of said firing point in said virtual space;
      generating an image of a trajectory along a virtual line connecting said starting point position and an ending point at which said discharge body fired from said firing point virtually arrives, wherein said viewpoint is maintained to show said shooting direction and a direction of said virtual line is set differently from said shooting direction but arrives at the same ending point; and
      displaying said trajectory image on said display unit.

2. The image generation device according to claim 1, wherein said trajectory image covers at least a portion of the virtual line between said starting point and said ending point.

3. The image generation device according to claim 1, wherein, when it is determined that said discharge body has hit said target object, said ending point is set at a point of said target object intersecting with a line along said shooting direction.

4. The image generation device according to claim 1, wherein, when it is determined that said discharge body has hit said target object, an approximate infinite distance on a line on said shooting direction is set as said ending point.

5. An image generation device comprising a computer system, said computer system comprising:
   image processing means configured to set a target object and a viewpoint in a virtual space, and to generate an image of said target object viewed from said viewpoint;
   a display unit configured to display said target object image;
   operational means to be operated by a player to perform a virtual shooting by aiming at said target object image displayed on said display unit;
   detection means to detect a shooting direction of said operational means in relation to said display unit; and
   control means configured to execute, when said player causes said operational means to fire, processing comprising:
      determining if a collision has occurred between a discharge body, which was virtually fired from a firing point set in said virtual space toward said target object image, and said target object, wherein the determining is in response to an operation signal indicating said shooting direction, said operation signal being provided from said operational means, wherein said firing point is determined in said virtual space corresponding to a position at which said operational means is held by said player in front of said display unit;

setting a starting point position by calculating a distance and a direction to be shifted from said firing point, based on angle information of said operational means, said starting point position being different from that of said firing point in said virtual space;

generating an image of a trajectory along a virtual line connecting said starting point position and an ending point at which said discharge body fired from said firing point virtually arrives, wherein said viewpoint is maintained to show said shooting direction and a direction of said virtual line is set differently from said shooting direction but arrives at the same ending point; and displaying said trajectory image on said display unit.

6. The image generation device according to claim 5, wherein said trajectory image covers at least a portion of the virtual line between said starting point and said ending point.

7. The image generation device according to claim 5, wherein, when it is determined that said discharge body has hit said target object, said ending point is set at a position of said target object intersecting with a line along said shooting direction.

8. The image generation device according to claim 5, wherein, when it is determined that said discharge body has not hit said target object, an approximate infinite distance on a virtual line on said shooting direction is set as said ending point.

9. A program product executed with an image processing system, said image processing system including:
    image processing means configured to set a target object and a viewpoint in a virtual space, and generating an image of said target object viewed from said viewpoint;
    a display unit configured to display said target object image;
    operational means to be operated by a player to perform a virtual shooting by aiming at said target object image displayed on said display unit;
    detection means to detect a shooting direction of said operational means in relation to said display unit, said program product being configured to execute instructions that cause said image. processing system to execute processing comprising:
        determining if a collision has occurred between a discharge body, which was virtually fired from a firing point set in said virtual space toward said target object image, and said target object, wherein the determining is in response to an operation signal indicating said shooting direction, said operation signal being provided from said operational means, wherein said firing point is determined in said virtual space corresponding to a position at which said operational means is held by said player in front of said display unit;
        setting a starting point position by calculating a distance and a direction to be shifted from said firing point, based on angle information of said operational means, said starting point position being different from that of said firing point in said virtual space;
        generating an image of a trajectory arranged along a virtual line extending between said starting point position and an ending point at which said discharge body fired from said firing point virtually arrives, wherein said viewpoint is maintained to show said shooting direction and a direction of said virtual line is set differently from said shooting direction but arrives at the same ending point; and
        displaying said trajectory image on said display unit.

10. The program product according to claim 9, wherein said trajectory image covers at least a portion of said virtual line between said starting point and said ending point.

11. The program product according to claim 9, wherein, when it is determined that said discharge body has hit said target object, said ending point is set at a position intersecting with a line along said shooting direction.

12. The program product according to claim 9, wherein, when it is determined that said discharge body has not hit said target object, an approximate infinite distance on a line on said shooting direction is set as said ending point.

13. An image processing device, comprising:
    image processing means configured to set a target object and a viewpoint in a virtual space, and to generate an image of said target object viewed from said viewpoint;
    a display unit configured to display said target object image;
    operational means to be operated by a player to perform a virtual shooting at said target object image displayed on said display unit;
    detection means to detect a shooting direction of said operational means in relation to said display unit; and
    control means configured to execute, when said player causes said operational means to virtually discharge a discharge object toward said image of said target object, processing comprising:
        determining a position of a firing point from which said discharge object is virtually discharged, said position of said firing point being determined in said virtual space corresponding to a position of said operational means in front of said display unit;
        determining a position of a shot point at which said discharge object has arrived;
        determining whether a collision has occurred between said discharge object and said target object at said shot point based on information indicating said shooting direction that has been detected by said detection means;
        setting an ancillary point by calculating a distance and a direction to be shifted from said shot point, based on angle information of said operational means, said ancillary point being at a position spaced apart by said distance from that of said firing point in said virtual space;
        generating a trajectory image for said discharge object;
        setting said trajectory image along an imaginary line connecting said ancillary point and said shot point; and
        displaying on said display unit a scene including said trajectory image and said target object image, said scene being viewed from a viewpoint showing a path of said imaginary line.

14. A shooting simulation apparatus, comprising:
    a display unit;
    image processing means configured to set a target object in a virtual three-dimensional space and to display an image of said target object that is viewed from a viewpoint on said display unit;
    operational means operable by a player to perform a virtual shooting at the target object;
    detection means to detect a shooting direction of said operational means; and
    control means configured to execute, when the player causes the operational means to fire, processes of:

determining a position of a firing point from which an object is virtually discharged, said position of said firing point being determined in the virtual space corresponding to a position of said operational means in front of said display unit;

determining a position of a shot point at which said discharged object has virtually reached;

determining whether said shot point has hit said target object based on information indicating said shooting direction that has been detected by said detection means;

setting an ancillary point by calculating a distance and a direction to be shifted from said shot point, based on angle information of said operational means, said ancillary point being at a position spaced apart by said distance from that of said firing point in said virtual space;

generating a trajectory image for said discharged body;

setting said trajectory image along an imaginary line between said ancillary point and said shot point; and displaying on said display unit a scene including said trajectory image and the target object, the scene being viewed from a viewpoint showing a path from said ancillary point.

15. A shooting simulation method executable on a computer system equipped with a display unit, image processing means configured to set a target object in a virtual three-dimensional space and to display an image of said target object, viewed from a viewpoint on said display unit, operational means operable by a player to perform a virtual shooting at a target displayed on said display unit, and detection means arranged to detect a shooting direction of said operational means, said shooting simulation method comprising, when the player operates the operational means to fire, the method comprising:

determining a position of a firing point from which an object is virtually discharged, said position of said firing point being set in the virtual space corresponding to a position of said operational means in front of said display unit;

determining a position of a shot point at which said discharged object has virtually reached;

determining whether said discharged object has hit said target object based on information indicating the shooting direction that has been detected by said detection means;

setting an ancillary point by calculating a distance and a direction to be shifted from said shot point, based on angle information of said operational means, said ancillary point being at a position spaced apart by said distance from that of said firing point in said virtual space;

generating a trajectory image for said discharged object;

setting the trajectory image along an imaginary line between said ancillary point and said shot point; and displaying on said display unit a scene including said trajectory image and said target object viewed from a viewpoint showing a path from said ancillary point.

16. A program product executable on a computer system equipped with a display unit, operational means operable by a player in front of said display unit, and detection means arranged to detect a shooting direction of said operational means, said program product comprising instructions which, when executed by a processor, cause the computer system to perform a method, the method comprising:

setting a target object in a virtual three-dimensional space and displaying an image of said target object viewed from a viewpoint on said display unit;

allowing a player to perform a virtual shooting at said target object displayed on said display unit;

detecting a shooting direction of said operational means when said player causes the operational means to fire;

determining positions of a firing point and a shot point at which an object discharged from said firing point has virtually reached, wherein the firing point is set in the virtual space corresponding to the position of the operational means located in front of said display unit;

determining whether said discharged object has hit said target object based on information indicating the shooting direction that has been detected by said detection means;

setting an ancillary point by calculating a distance and a direction to be shifted from said shot point, based on angle information of said operational means, said ancillary point being at a position spaced apart by said distance from said firing point in said virtual space;

generating a trajectory image of said discharged object; and displaying on said display unit a scene including said trajectory image and said target object viewed from a viewpoint set from said ancillary point so that said trajectory image is indicated along an imaginary line between said ancillary point and said shot point.

17. The image generation device according to claim 1, wherein said control means calculates said distance and said angle to be shifted from said firing point in a horizontal or a lateral direction such that an arbitrary point on a screen of said display unit becomes said starting point position.

18. The image generation device according to claim 5, wherein said control means calculates said distance and said angle to be shifted from said firing point in a horizontal or a lateral direction such that an arbitrary point on a screen of said display unit becomes said starting point position.

19. The program product according to claim 9, wherein said control means calculates said distance and said angle to be shifted from said firing point in a horizontal or a lateral direction such that an arbitrary point on a screen of said display unit becomes said starting point position.

20. The image processing device according to claim 13, wherein said control means calculates said distance and said angle to be shifted from said firing point in a horizontal or a lateral direction such that an arbitrary point on a screen of said display unit becomes said ancillary point.

21. The shooting simulation apparatus according to claim 14, wherein said control means calculates said distance and said angle to be shifted from said shot point in a horizontal or a lateral direction such that an arbitrary point on a screen of said display unit becomes said ancillary point.

22. The shooting simulation method according to claim 15, wherein said distance and said angle to be shifted from said shot point is calculated in a horizontal or a lateral direction such that an arbitrary point on a screen of said display unit becomes said ancillary point.

23. The program product according to claim 16, wherein said distance and said angle to be shifted from said shot point is calculated in a horizontal or a lateral direction such that an arbitrary point on a screen of said display unit becomes said ancillary point.

* * * * *